No. 802,688.

PATENTED OCT. 24, 1905.

J. HARDING, Jr.
CLUTCH MECHANISM.
APPLICATION FILED MAR. 8, 1905.

3 SHEETS—SHEET 1.

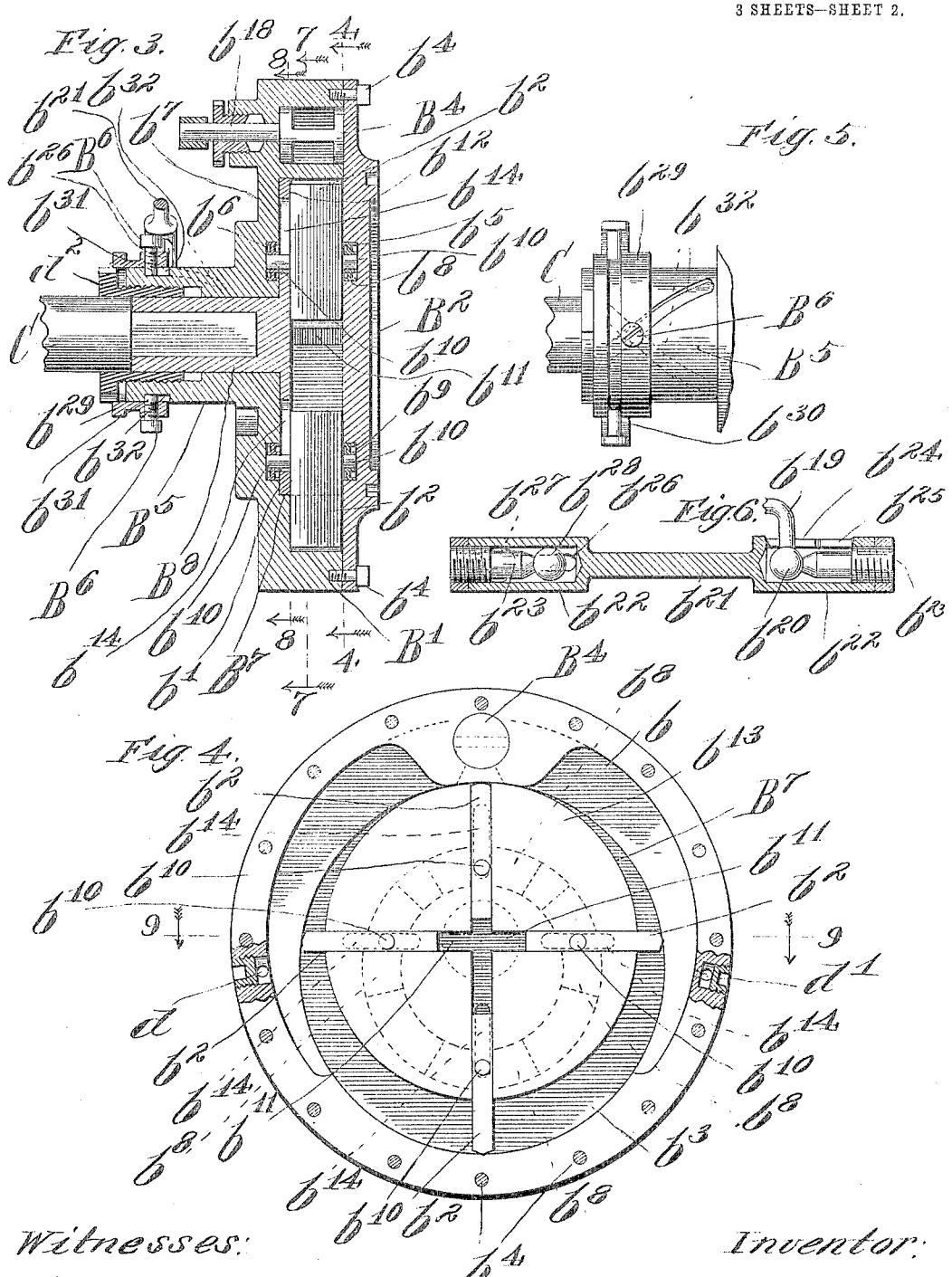

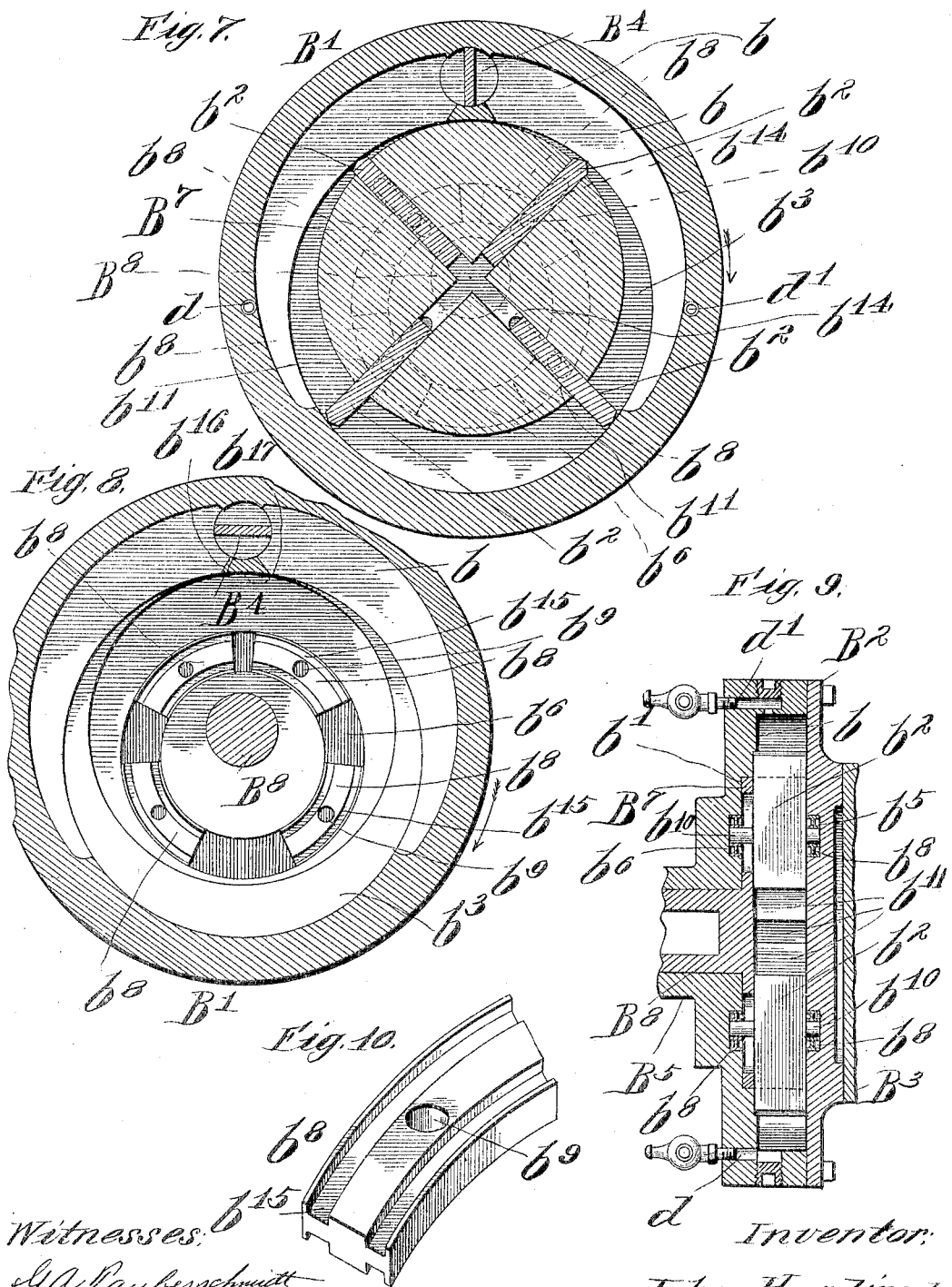

UNITED STATES PATENT OFFICE.

JOHN HARDING, JR., OF NASHVILLE, TENNESSEE, ASSIGNOR TO JOHN T. LANDIS, OF NASHVILLE, TENNESSEE.

CLUTCH MECHANISM.

No. 802,688.          Specification of Letters Patent.          Patented Oct. 24, 1905.

Application filed March 8, 1905. Serial No. 249,020.

*To all whom it may concern:*

Be it known that I, JOHN HARDING, Jr., a citizen of the United States, residing at Nashville, in the county of Davidson and State of Tennessee, have invented a new and useful Improvement in Clutch Mechanism, of which the following is a specification.

My invention relates particularly to clutch mechanism in which liquid is employed as an agent for connecting a driving and a driven part.

My primary object is to provide clutch mechanism of this character possessing great durability and capable of being constructed readily with such accuracy of parts as to insure perfectly tight joints and smooth operation.

The invention is illustrated in the accompanying drawings, in which—

Figure 1 represents a side elevational view of my improved clutch mechanism applied to a shaft, such as an engine-shaft; Fig. 2, an end elevational view of the same; Fig. 3, a section taken as indicated at line 3 of Fig. 2; Fig. 4, a section taken as indicated at line 4 of Fig. 3; Fig. 5, a broken detail view of a portion of a valve-operating device; Fig. 6, a section taken as indicated at line 6 of Fig. 2; Fig. 7, a section taken as indicated at line 7 of Fig. 3; Fig. 8, a sectional view of the casing, taken as indicated at line 8 of Fig. 3 and showing one set of vane-controlling ring-sections employed; Fig. 9, a broken section taken as indicated at line 9 of Fig. 4; and Fig. 10, a perspective view of one of the vane-controlling ring-sections.

In the construction shown, the improved mechanism is shown applied to and constituting the balance-wheel of an engine-shaft.

A represents the engine-shaft, which constitutes a driving-shaft, the same being supported in a bearing A'; B, my improved clutch mechanism, and C a driven shaft operated through the medium of the clutch mechanism. The clutch mechanism comprises a casing B', equipped with a removable plate $B^2$, connected with a disk $B^3$, rigidly secured on the end of the shaft A; a valve $B^4$, controlling a liquid-circuit $b$ within the casing; a hub or sleeve $B^5$, formed integrally with the non-removable side of the casing; a valve-operating device $B^6$, mounted on the sleeve $B^5$; a core or head $B^7$, confined in a port $b'$ within the casing and equipped with radially-slidable vanes $b^2$, whose outer ends work within an oval-form chamber $b^3$, forming a part of the liquid-circuit, and a stub-shaft $B^8$, formed integrally with one side of the core $B^7$, journaled in the sleeve $B^5$ and provided with a squared socket receiving the squared end of the shaft C. The casing-plate $B^2$ has a ground plain inner surface which forms a liquid-tight joint with the body of the casing, the plate being securely attached by cap-screws $b^4$. On the inner surface of the plate $B^2$ is formed a circular groove $b^5$, which is eccentric to the core $B^7$, said core being concentric with its stub-shaft $B^8$ and with the body of the casing. Directly opposite the circular groove $b^5$ and concentric therewith is a circular groove $b^6$, formed in the inner surface of the non-removable side $b^7$ of the casing. Within the grooves $b^5$ $b^6$ are ring-sections $b^8$, provided with bearings $b^9$ for lateral pins $b^{10}$, with which the vanes $b^2$ are equipped. The core $B^7$ is provided with radial slots $b^{11}$, which cross each other at the center of the core and which are open at the side of the core adjacent to the plate $B^2$, so that the plate $B^2$ affords a confining wall for the vanes at one lateral edge thereof. The slots $b^{11}$ are of sufficient depth to receive the vanes, enough metal remaining at the other side of the core to form a connecting-web $b^{12}$, which unites the sections $b^{13}$, into which the grooves divide the core. The web $b^{12}$ is provided with radial slots $b^{14}$, through which the pins $b^{10}$ at the corresponding edges of the vanes extend, the pins thereat being longer than the pins at the opposite ends of the vanes, as shown. The vane-actuating ring-sections $b^8$ are provided at their lateral surfaces with longitudinally-extending grooves $b^{15}$, through which the oil may pass freely from one space between the ring-sections to another to enable the necessary relative movement between the ring-sections to take place. The valve $B^4$ is located in a chamber formed in a bridge $b^{16}$, crossing the liquid-circuit $b$. The bridge $b^{16}$ has a concave surface $b^{17}$, with which the core $B^7$ is in close contact. The valve is equipped with a stem $b^{18}$, which protrudes through a stuffing-box at the non-removable side of the casing, and this stem is equipped with an arm $b^{19}$, having a laterallyturned end equipped with a ball $b^{20}$, joined to a connecting-rod $b^{21}$, as shown in Fig. 6. The connecting-rod $b^{21}$ is provided with enlarged hollow ends $b^{22}$, equipped with movable threaded plugs $b^{23}$. A slot $b^{24}$ in one of the heads $b^{22}$ serves to admit the arm $b^{19}$, an enlargement $b^{25}$ at the outer end of the slot enabling the ball to be entered. After the ball has been entered the plug $b^{23}$ is turned in to secure the ball against removal. The opposite end of the connecting-rod is provided with a slot $b^{26}$, provided with an enlargement $b^{27}$, the slot $b^{26}$ being at right angles to the slot $b^{24}$. This slot receives a headed arm $b^{28}$, connected with a shiftable ring $b^{29}$, mounted on the sleeve $B^5$. A shipping-lever $b^{30}$ serves as a medium for shifting the ring $b^{29}$, and said ring is provided internally with studs $b^{31}$, which work in cam-grooves $b^{32}$, with which the outer surface of the sleeve $B^5$ is provided. It will be understood that when the ring $b^{29}$ is shifted longitudinally of the sleeve $B^5$ the cam connection will serve to rotate the ring and through the medium of the connecting-rod $b^{21}$ will operate the valve $B^4$. It is understood, of course, that the arms $b^{19}$ $b^{28}$ are universally connected with the connecting-rod by means of the construction described. The casing is equipped with an inlet-passage $d$ and a vent-passage $d'$, which may be provided with any suitable closing means, enabling the clutch to be filled with oil or other liquid. A suitable stuffing-box $d^2$ is provided for the stub-shaft $B^8$.

From the foregoing detailed description the manner of use will be readily understood. Assuming power to be applied through the medium of the shaft A, the casing $B'$ will rotate with said shaft, and if the valve $B^4$ be closed force will be transmitted from the bridge and the valve therein through the medium of the liquid to the vanes of the inner head. Inasmuch as there can be no yielding, assuming the construction to be perfect, the inner head will be locked to and rotate with the outer head or casing. When it is desired to transmit slower motion to the shaft C, the valve $B^4$ may be opened by shifting the ring $b^{29}$, thereby enabling liquid to pass the valve. Under such conditions the inner head will rotate slower than the outer head or casing, its rate of rotation depending upon the degree to which the valve is open. Should the valve be wide open, so that there would be no effective resistance to the passage of the liquid, the inner head would remain at rest while the outer head would continue to rotate.

Where the clutch mechanism is employed on the shaft of an engine as a balance-wheel, it is evident that the engine may be kept working at its normal speed and horse-power under any and all conditions by regulating the position of the circuit-controlling valve. This is of obvious advantage in various situations, among which may be mentioned the situation where it is sometimes desirable to permit the engine to "speed up" to enable a pump connected therewith to do an increased amount of work, while the main work performed by the engine, such as the propulsion of an automobile, is diminished. This expedient enables the amount of water delivered to a boiler, for instance, to be regulated at will.

Other changes incident to my improved construction will readily occur to those skilled in the art.

What I regard as new, and desire to secure by Letters Patent, is—

1. In clutch mechanism, the combination with a casing having a liquid-circuit, a valve controlling said circuit, and internal circular grooves, of a core within said casing eccentric to said circular grooves and equipped with slidable vanes, and ring-sections pivotally joined to said vanes and moving in said grooves, whereby the vanes are projected and retracted as the casing and core move relatively to each other, for the purpose set forth.

2. In clutch mechanism, the combination of a casing having ends equipped internally with circular grooves, a core journaled in one end of said casing eccentric to said circular grooves, radially-movable vanes connected with said core, relatively movable ring-sections located in said grooves and pivotally joined to the lateral edges of said vanes, and a valved liquid-circuit into which said vanes are projected as the casing and core move relatively to each other, for the purpose set forth.

3. In a clutch, the combination of a casing having a liquid-circuit and having ends provided with internal circular grooves located opposite each other, one of said ends being removable, a core having a shaft journaled in the non-removable casing end eccentrically with relation to said grooves, said core having radial slots open at one side of the core and a web connecting the sections into which it is divided by said radial slots, said web having radial slots, vanes located in said first-named radial slots and having contact at one lateral edge with the removable casing end and at the opposite edge with said web, ring-sections located in said circular grooves, pivots connecting said ring-sections with the lateral edges of said vanes, the pivots at one side extending through said second-named radial slots, and a valve controlling the liquid-circuit, for the purpose set forth.

4. In clutch mechanism, the combination of a casing having a valved liquid-circuit and provided with circular grooves, relatively movable ring-sections in said grooves provided with liquid-passages, and a core journaled in said casing and equipped with movable vanes connected with said ring-sections, for the purpose set forth.

5. In clutch mechanism, the combination of a casing equipped at one end with an external hub, a shiftable ring mounted on said hub and having cam connection therewith serving to rotate the ring when it is shifted, a liquid-circuit in the casing, a valve controlling said circuit having a stem projecting from the casing and equipped with an arm, an arm connected with said ring, a connecting-rod having universal connection with said arms, and a core journaled in said casing and equipped with movable vanes, for the purpose set forth.

JOHN HARDING, JR.

In presence of—
   GEO. CAMPBELL BROWN,
   J. ROY BOONE.